United States Patent
Newman et al.

(10) Patent No.: US 11,800,480 B1
(45) Date of Patent: Oct. 24, 2023

(54) ULTRA-LEAN TIMING SIGNAL FOR PRECISION SYNCHRONIZATION IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 0 days.

(21) Appl. No.: 18/215,196

(22) Filed: Jun. 28, 2023

Related U.S. Application Data

(63) Continuation of application No. 18/096,047, filed on Jan. 12, 2023, now Pat. No. 11,737,044.

(60) Provisional application No. 63/437,839, filed on Jan. 9, 2023, provisional application No. 63/435,061, filed on Dec. 23, 2022, provisional application No. 63/476,032, filed on Dec. 19, 2022, provisional application No. 63/431,810, filed on Dec. 12, 2022.

(51) Int. Cl.
    *H04L 27/36*      (2006.01)
    *H04W 56/00*      (2009.01)
    *H04L 7/00*       (2006.01)

(52) U.S. Cl.
    CPC ......... *H04W 56/005* (2013.01); *H04L 7/0037* (2013.01)

(58) Field of Classification Search
    CPC ........................... H04W 56/005; H04L 7/0037
    See application file for complete search history.

(56) References Cited

U.S. PATENT DOCUMENTS

| | | |
|---|---|---|
| 6,058,101 A | 5/2000 | Huang |
| 7,649,912 B2 | 1/2010 | Balasubramanian |
| 7,991,362 B2 | 8/2011 | Lane |
| 10,375,659 B1 | 8/2019 | Ramlall |
| 10,868,664 B2 | 12/2020 | Goldin |
| 2008/0186906 A1 | 8/2008 | Defrance |
| 2010/0097153 A1 | 4/2010 | Rexberg |
| 2011/0216816 A1 | 9/2011 | Frenzel |
| 2014/0068315 A1 | 3/2014 | Aweya |
| 2018/0145780 A1 | 5/2018 | Zhao |
| 2019/0326916 A1 | 10/2019 | Parra Vilchis |
| 2020/0351189 A1 | 11/2020 | Horn |
| 2021/0159995 A1 | 5/2021 | Zhang |
| 2022/0123849 A1 | 4/2022 | McCall |
| 2022/0131627 A1* | 4/2022 | Beacall .............. H04B 17/3913 |

* cited by examiner

*Primary Examiner* — Jamal Javaid

(57) ABSTRACT

Synchronization between a base station and user devices is crucial for high-frequency 5G and especially 6G communications. Disclosed is a fast, compact timing signal comprising an abrupt change in a downlink signal modulation, centrally positioned in a predetermined symbol-time. Each user device can receive the downlink timing signal, digitize the received signal, and determine a specific time at which the modulation switches. The user device can then determine whether the specific time is at a midpoint of the predetermined symbol-time, and if not, can determine a timing offset according to the difference. Since the user device's symbol-time boundaries are determined by the user device's clock, whereas the timing signal is determined by the base station, the timing offset generally indicates a setting error of the user device's clock, in which case the user device can reset its clock to agree with the base station clock.

7 Claims, 10 Drawing Sheets

FIG. 1B

151 - Base station: Transmit a timing signal, in a predetermined resource element, consisting of a sine wave with an initial phase in the first half of the resource element, followed by a second sine wave with the opposite phase in the second half.

152 - User device: Receive the timing resource element. Digitize the received signal and extract the predetermined subcarrier with the timing signal.

153 - Measure phase versus time in forward direction and in the backward direction. Determine abrupt transition between opposite phases.

154 - Optionally, select midpoint between the zero-cross times of the forward and backward transitions as the timestamp point.

155 - Optionally, determine the time of the timestamp point by comparing the digitized timing signal with a uniform sine wave, and determine the time of phase change.

156 - Optionally, slide a fitting template along the digitized data, calculating quality of fit versus fitting time. Center of peak is the timestamp point.

157 - Optionally, calculate a sensitizing function, such as the second derivative of the timing signal, and locate the maximum or minimum function value.

158 - Optionally, determine the timestamp point by multiple methods and calculate a weighted average, weighted by estimated uncertainty of each method.

FIG. 5B

551 - Transmitter: Transmit, in one resource element, a timing signal with orthogonal I and Q branches. The first half of the timing signal has a maximum amplitude in the I branch and zero transmission in the Q branch, and the second half has the Q amplitude at maximum and the I amplitude at zero.

552 - Receiver: Receive the timing resource element, extract the I and Q branches, and measure their amplitudes in the first half and the second half of the symbol-time.

553 - Determine the time of a timestamp point by finding a time where the non-zero I and Q amplitudes briefly overlap.

554 - Determine the time of the timestamp point by scanning the I and Q amplitudes from the left and from the right. Note transitions between max and zero amplitudes. Timestamp point is midway between the two transitions.

555 - Convert the I and Q branch signals to a sum-signal equal to the vector sum of the branches. Determine the phase of the sum-signal and note where the phase changes.

556 - Prepare a fitting template with I and Q branches emulating the expected branch inversion at the timestamp point. Vary the template until a high-quality fit is achieved.

557 - Combine the above-described method results according to a weighted average, the weighting being according to an uncertainty of each result.

ULTRA-LEAN TIMING SIGNAL FOR PRECISION SYNCHRONIZATION IN 5G AND 6G

PRIORITY CLAIMS AND RELATED APPLICATIONS

This application is a continuation of U.S. patent application Ser. No. 18/096,047, entitled "Mid-Symbol Timestamp Point for Precision Synchronization in 5G and 6G", filed Jan. 12, 2023, which claims the benefit of U.S. Provisional Patent Application Ser. No. 63/431,810, entitled "Mid-Symbol Timestamp Point for Precision Synchronization in 5G and 6G", filed Dec. 12, 2022, and U.S. Provisional Patent Application Ser. No. 63/476,032, entitled "Guard-Space Timestamp Point for Precision Synchronization in 5G and 6G", filed Dec. 19, 2022, and U.S. Provisional Patent Application Ser. No. 63/435,061, entitled "Compact Timing Signal for Low-Complexity 5G/6G Synchronization", filed Dec. 23, 2022, and U.S. Provisional Patent Application Ser. No. 63/437,839, entitled "Ultra-Lean Synchronization Procedure for 5G and 6G Networking", filed Jan. 9, 2023, all of which are hereby incorporated by reference in their entireties.

FIELD OF THE INVENTION

The disclosure pertains to synchronization of clocks using a wireless message that contains a timestamp point.

BACKGROUND OF THE INVENTION

Wireless messages depend on extremely controlled timing, so that modulated signals can be received at the expected time with the correct frequency. Distributing the timing information by cable is no longer feasible, as many users are mobile or at least portable; hence the time synchronization and clock rate are generally distributed in wireless messages. However, due to the very high frequencies planned for in 5G and 6G, improved means are needed to enable user devices to adjust their timing and frequency without excessive messaging and overhead.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a user device of a wireless network to synchronize with a base station of the wireless network, the method comprising: determining, according to a clock of the user device, a resource grid comprising symbol-times in time and subcarriers in frequency, wherein each symbol-time includes a starting time and an ending time, as determined by the clock of the user device; receiving a timing signal in a predetermined resource element of the resource grid, wherein the timing signal comprises a first signal followed by a second signal, wherein a phase of the first signal differs from a phase of the second signal; determining a timestamp time corresponding to a boundary between the first and second signals; determining, according to a difference between the timestamp time and the starting or ending time of the predetermined resource element, a timing offset; and adjusting the clock of the user device according to the timing offset, to bring the clock of the user device into agreement with a clock of the base station.

In another aspect, there is a method for a user device of a wireless network to synchronize with a base station of the wireless network, the method comprising: determining, according to a clock of the user device, a resource grid comprising symbol-times in time and subcarriers in frequency, wherein each symbol-time comprises a starting time at a start of the symbol-time and an ending time at an end of the symbol-time, as determined by the clock of the user device; receiving a timing signal in a predetermined resource element of the resource grid, wherein the timing signal comprises a first signal followed by a second signal followed by a third signal, wherein an amplitude of the first signal equals an amplitude of the third signal, and an amplitude of the second signal differs from the amplitude of the first and third signals; determining a timestamp time corresponding to a center of the second signal; determining, according to a difference between the timestamp time and the starting or ending time of the predetermined resource element, a timing offset; and adjusting the clock of the user device, according to the timing offset, to bring the clock of the user device into agreement with a clock of the base station.

In another aspect, there is a wireless transmitter configured to: determine a resource grid comprising symbol-times and subcarrier frequencies; and transmit, at a particular symbol-time and a particular subcarrier, a timing signal comprising a first modulation in a first portion of the particular symbol-time, followed by a second modulation, different from the first modulation, in a second portion of the particular symbol-time.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 1B is a flowchart showing an exemplary embodiment of a procedure for transmitting and receiving a timestamp point, according to some embodiments.

FIG. 5B is a flowchart showing an exemplary embodiment of a procedure for transmitting and receiving a timestamp signal containing a branch reversal, according to some embodiments.

Like reference numerals refer to like elements throughout.

DETAILED DESCRIPTION

Figure 1A:
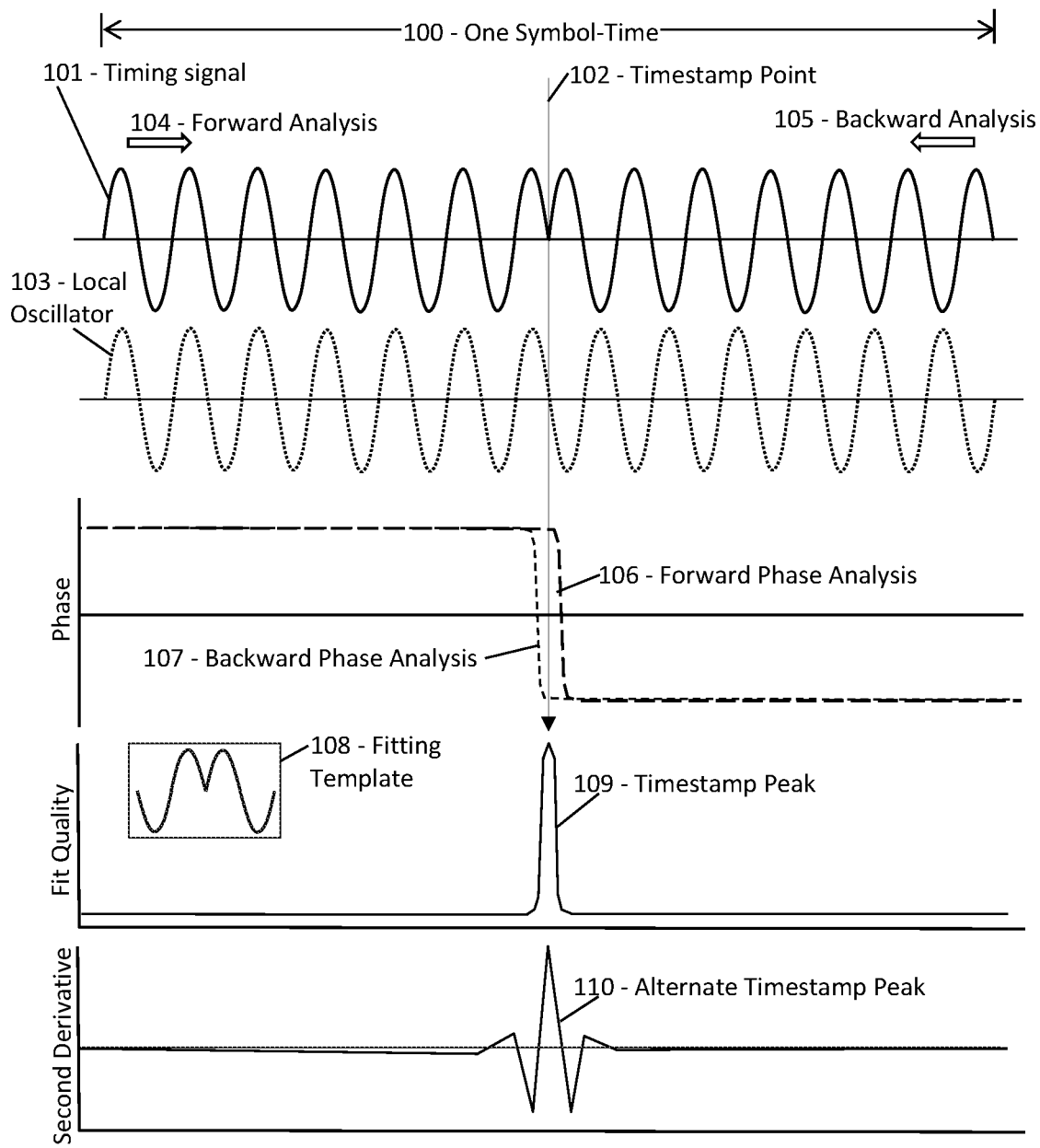
FIG. 1A is a schematic showing an exemplary embodiment of a timing signal containing a phase reversal, according to some embodiments.

Systems and methods disclosed herein (the "systems" and "methods", also occasionally termed "embodiments" or "arrangements" or "versions" or "examples", generally according to present principles) can provide urgently needed wireless communication protocols for precisely synchronizing clocks using wireless messages that provide an explicit timestamp point that a receiver can measure. Improved precision timing will be required for reliable communication at the high frequencies planned for 5G and 6G. An explicit mid-symbol timestamp point is disclosed herein, configured to enable each user device to adjust its clock setting and clock rate in conformity with the base station. The user device can then transmit uplink signals so that they will arrive at the base station aligned with the base station's symbol boundaries and subcarrier frequencies.

The procedures include transmitting and receiving a mid-symbol timestamp point, which is a detectable change in modulation of a "synchronization waveform" or "timing signal" at the midpoint of a symbol-time, according to some embodiments. For example, a mid-symbol timestamp point may be a sudden phase or amplitude reversal, or a momentary increase or decrease in the signal amplitude, or an abrupt interchange between I and Q quadrature branch signals, or other abrupt signal change that a receiver can precisely measure. The mid-symbol timestamp point is generally transmitted at the center of a "timing resource element", which is a resource element that includes a mid-symbol timestamp point. The timing signal generally consists of a first portion of a symbol-time followed by a second portion, wherein the first and second portions are differently modulated, and the timestamp point is the interface between the two modulated regions. The receiver can measure the time of the timestamp point relative to the receiver's resource grid, that is, according to the receiver's symbol-time boundaries and clock frequency. However, the arrival of the timing signal is determined by the transmitter's clock. Therefore, any deviation of the as-received timestamp point, relative to the middle of the receiver's symbol-time, represents a clock disagreement between the transmitter and receiver.

A timing resource element differs from a normal message element in that the timing signal includes a change in amplitude or phase within the symbol-time, whereas normal message elements are modulated uniformly during the symbol-time. Also, the timing signal generally has a larger bandwidth than the uniformly-modulated message elements. The receiver can precisely determine a reception time of the timestamp point, using any suitable signal processing and analysis means. For example, the receiver can precisely determine the time of the mid-symbol timestamp point by at least one of the following: (a) digitizing the synchronization waveform and detecting the modulation change digitally therein; or (b) performing a phase analysis on the digitized data, proceeding sequentially in both forward and backward (time) directions, to determine the transition time between the different modulations, and then averaging the two results; or (c) fitting the synchronization waveform with a fitting template shaped to match only the region around the timestamp point; or (d) calculating a high-order derivative (or other sensitizing function) of the synchronization waveform, which peaks at the timestamp point; or (e) determining the magnitude of the timing signal and searching for a peak or dip representing the modulation change; or (f) determining a ratio of orthogonal I and Q branches, thereby indicating the timestamp point as a sharp change in the ratio; or (g) using other analysis procedures suitable for determining the reception time of the timestamp point with sufficient precision.

Special signal processing may be used to extract the timestamp point from the timing signal. In regular message processing, the receiver can digitize each message element, discard the guard-space region, and then average the remaining signal over the rest of the symbol-time. For a timing signal, however, the averaging would likely obscure the modulation change at the timestamp point. In addition, the modulation change represents a larger bandwidth than a normal message element, as mentioned. Therefore, the receiver may apply suitable signal processing to the raw digitized data of the timing resource element, to extract the time information therein. In addition, to prevent interference from adjacent message data, and to accommodate sidebands and the like produced by the sudden modulation change of the timestamp point, the transmitter may leave the adjacent subcarriers blank, both above and below the timing resource element.

The examples presented below are suitable for adoption by a wireless standards organization. Providing a compact, precision timestamp point within a timing resource element may enable user devices to rapidly synchronize to the base station, and may thereby optimize communication reliability at high frequencies, at minimal cost in resources and power, according to some embodiments.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "subchannel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "QAM" (quadrature amplitude modulation) or "PAM" (pulse-amplitude modulation) refers to two signals, separately amplitude-modulated, and then multiplexed and transmitted with a 90-degree phase shift between them. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. QPSK is phase modulated but not amplitude modulated. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal.

In addition to the 3GPP terms, the following terms are defined. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. "RF" or radio-frequency refers to electromagnetic waves in the MHz (megahertz) or GHz (gigahertz) frequency ranges. The "raw" or "overall" signal is the as-received waveform before separation of the quadrature branch signals, and includes a raw-signal amplitude and a raw-signal phase. The raw signal and/or the branch signals may be downshifted in frequency before digitization. Referring to quadrature or QAM or PAM modulation, an "I-Q" space is an abstract two-dimensional space defined by an I-branch amplitude and an orthogonal Q-branch amplitude, in which each transmitted message element occupies one of several predetermined I-Q states of a modulation scheme. The orthogonal branches are sometimes called "real" and "imaginary", and the I-Q space is sometimes called the "complex plane". The receiver can combine the branch amplitudes to determine a "sum-signal", which is the vector sum of the I and Q branch signals and generally approximates the overall waveform. A vector sum is a sum of two vectors, which in this case represent the amplitudes and phases of the two orthogonal branches in I-Q space. The sum-signal has a "sum-signal amplitude", equal to the square root of the sum of the I and Q branch amplitudes squared (the "root-sum-square" of I and Q), and a "sum-signal phase", equal to the arctangent of the ratio of the I and Q signal amplitudes (plus an optional base phase, ignored herein). Thus the sum-signal represents the raw or overall received waveform, aside from signal processing errors in the receiver which are generally negligible and are ignored herein.

In addition, the following terms specific to synchronization are defined. As used herein, a "timing resource element" is a resource element that includes an explicit timestamp point. An "explicit timestamp point" is a sudden modulation change in a "timing signal" in a timing resource element. A "synchronization waveform" is the actual received wave signal (possibly downshifted in frequency) of the timing signal. A "mid-symbol timestamp point" is an abrupt change in the timing signal at or near the midpoint of a symbol-time of a timing resource element. The "transmission-reception delay" is a measured time interval between transmitting and receiving a particular timestamp point, which generally includes the signal propagation time between antennas, as well as electronic and processing delays at the transmitter and at the receiver. The "reply delay" is a predetermined interval between the reception time of a first timestamp point and the transmission time of a reply timestamp point. A "timing advance" is a time adjustment that a user device applies to its uplink transmissions so that they will arrive at a base station at the proper time, synchronized with the base station's resource grid. A "frequency offset" is an adjustment in frequency that a mobile user device applies to its uplink transmissions to compensate Doppler shifts, so that the uplink message will arrive at a base station with the proper frequency, aligned with the base station's subcarriers. A "frame schedule" is a listing or formula, provided by a base station, indicating the specific times of frame and symbol boundaries in the base station's resource grid. A "synchronization schedule" is a listing or formula, provided by a base station, indicating the specific times and frequencies at which the base station plans to broadcast timing signals. A receiver can then receive, at the scheduled time, a resource element that includes a timing signal that includes a mid-symbol timestamp point, and can determine the time of the timestamp point as determined by the receiver's clock. The receiver can then compare the time of the received timestamp point to the expected time according to the synchronization schedule, and can ascribe any difference to a drift of the user device's clock time. The user device can then correct its clock time accordingly. In a similar way, a receiver can receive two spaced-apart timing signals with a known separation according to the schedule, and can measure a time interval between the two timestamp points as-received. The user device can then determine a frequency disagreement according to a difference between the measured interval and the expected interval. The user device can then adjust its clock rate to remove the frequency disagreement. Thus by measuring a first mid-symbol timing signal, the user device can synchronize its clock setting with the base station, and by measuring the interval between periodic mid-symbol timing signals, the user device can adjust its clock rate, without exchanging unnecessary messages or other unnecessary overhead.

In another embodiment, the user device can adjust its clock time according to the received timestamp point minus the previously determined timing advance. The user device can also adjust its transmission frequency to compensate a previously determined Doppler shift. The user device can then transmit uplink messages according to its resource grid without further corrections, so that the uplink transmissions will arrive at the right time and frequency for reception by the base station. In this arrangement, the user device receives downlink messages displaced in time by minus the timing advance, and offset in frequency by twice the Doppler shift. The user device has already determined these values, can therefore can compensate for those offsets by applying the known corrections to the received signals before demodulation. In some embodiments, the user device can maintain two resource grids, one for uplink transmissions and the other for downlink receptions. The uplink grid is timed with the base station's resource grid minus the timing advance and frequency-adjusted for Doppler correction, while the downlink grid is timed for proper reception of messages at the receiver, including the opposite corrections in time and frequency, according to the user device's resource grid. Use of two resource grids, offset in time and frequency, may simplify operations of the user device, such as configuring its uplink transmissions and signal processing of received messages.

Turning now to the figures, examples show how a precision timestamp point can be configured in a timing resource element.

FIG. 1A is a schematic showing an exemplary embodiment of a timing signal containing a phase reversal, according to some embodiments. As depicted in this non-limiting example, a timing signal 101 is depicted as a sinusoidal wave spanning a resource element of width one symbol-time 100. In this example, the timing signal 101 fills the symbol-time including the guard space (not separately indicated). In other embodiments, the timing signal 101 may fill just the data portion of the symbol-time, exclusive of the guard-space. In the example, a timestamp point 102 (thin vertical arrow) is shown centered in the timing signal 101, at which the phase of the timing signal 101 suddenly reverses by 180 degrees. Also shown, in dots, is a local oscillator sine wave 103. The local oscillator 103 is initially in phase with the timing signal 101 before the timestamp point 102, and abruptly reverses to the opposite phase after the timestamp point 102.

The receiver can analyze the timing signal 101 in various ways to determine the precise time of the timestamp point 102. In a first embodiment, the receiver can determine the time of the timestamp point 102 by digitizing the timing signal 101 and determining which digitized point in the data corresponds to the phase reversal. Since the digitization is controlled by the local time-base, the time of the phase reversal may be determined and the local clock time can be updated to match the time-base of the transmitter. This point-by-point method requires a large bandwidth and a sufficiently strong signal for reliable digitization of the raw waveform, but with sufficient SNR can enable precise determination of the time of the timestamp point, according to some embodiments.

In a second embodiment, suitable for lower SNR cases, a receiver can analyze the timing signal 101 by comparing the timing signal 101 with the local oscillator wave 103 (using, for example, a mixer or digital interference). The interference or mixing is sensitive to the relative phase. In some embodiments, the relative phase analysis may be carried out twice, in opposite time directions. For example, the relative phase between the timing signal 101 and the local oscillator 103 can first be determined sequentially in the forward direction, as indicated by a forward arrow 104. This results in a phase response curve 106 such as that shown, which inverts slightly beyond the timestamp point 102. The receiver can then repeat the relative phase analysis in the reverse direction, as indicated by another arrow 105, and can thereby obtain a reverse phase response curve 107. In each case, and in general, the relative phase is not instantaneously detected upon passing over the timestamp point 102, but instead is recognized by the receiver slightly later, due to the time required to accumulate sufficient amplitude data to recognize the change in relative phase. This results in a small "hysteresis-like" displacement of the transition, when passing through the timestamp point 102 in the forward and backward directions. In the example, when analyzing in the forward direction, the receiver can determine that the first half of the timing signal 101 is in phase with the local oscillator wave 103. After passing through the phase change at the timestamp point 102, the receiver soon discovers that the phase has changed, and thereafter is 180 degrees out of phase with the local oscillator 103. The resulting displacement depends on many factors such as the strength of the signal, noise effects, the electronics of the receiver, software such as smoothing and integrating software, and the like. However, the displacement is generally the same (in magnitude) for both forward and backward analysis directions. Therefore, the receiver can determine the timestamp point with improved precision by averaging or splitting the forward and backward phase response curves 106-107, or otherwise selecting a point midway between the two phase transitions, as indicated in the figure.

In a third embodiment, the receiver may determine the timestamp point 102 using a "fitting template" 108, such as a short fitting function that emulates the expected timestamp point configuration, which in this case is a sharp 180-degree phase reversal. The receiver can then vary the fitting time (the position of the fitting template 108) along the received timing signal 101 while determining the fit quality according to a match or overlap between the template 108 and the timing signal 101. The fitting time of the template 108 can be varied iteratively until a high-quality fit is obtained. The timestamp peak 109 represents a range in time that provides an enhanced fit quality of the template 108 to the timing signal 101, and the timestamp point 102 is the fitting time with the highest fit quality. The fit search can generally be performed efficiently. For example, the receiver can start the search at the center, determine whether the overlap is positive or negative, and then slide the template 108 left or right depending on the sign or the rate of change. The template usually converges upon the best-fit time in just a few iterations. The "Fit Quality" curve 108 shows the quality of the fit versus fit time, and exhibits a sharp peak at the precise position of the timestamp point 102, because that is the only time at which the template matches the timing signal 101. The fitting technique generally converges even when the SNR is low, because the fit quality is calculated using data throughout the range of the fitting template 108, rather than individual digitized points.

In a fourth embodiment, the receiver can calculate a second derivative, or other function, of the timing signal 101 versus position in the symbol-time 100. If the noise and interference are low enough, the sudden phase change may appear as a strong second-derivative spike at the "alternate" timestamp peak 110, thereby determining the timestamp point 102.

The optimal procedure for localizing the timestamp point generally depends on many factors such as the strength of the received signal, the noise and interference, the receiver properties such as filtering and bandwidth limits, and others. Therefore, the receiver may perform all four of the procedures listed, or other analyses to be devised, and may take an average, or a weighted average, or other combination, of the various results to obtain best timing precision.

FIG. 1B is a flowchart showing an exemplary embodiment of a procedure for transmitting and receiving a timestamp point, according to some embodiments. As depicted in this non-limiting example, at 151 a base station broadcasts a timing signal on a predetermined schedule. The timing signal fills a predetermined symbol-time of a predetermined subcarrier with a sine wave that reverses its phase in the middle of the symbol-time. Due to the mid-symbol modulation change, the bandwidth of the timing signal is larger than the bandwidth of a normal message element. Hence the base station may arrange to leave the adjacent subcarriers blank, by transmitting no signal in the subcarriers above and below the predetermined subcarrier, during the predetermined symbol-time.

At 152, a user device can receive an OFDM symbol in the predetermined symbol-time. The OFDM symbol includes the timing signal overlapping with numerous other subcarrier signals, each with slightly different frequencies. The user device can digitize the received signal and extract the timing signal. Due to bandwidth spreading and sidebands around the timing signal, potentially into the adjacent subcarriers, the user device can analyze energy received in the adjacent subcarriers as well as the predetermined subcarrier. The user device may, optionally, separate two orthogonal branches for convenient signal processing, and may subsequently recombine the branch data to determine the time of the timestamp point.

At 153, the user device can measure the phase variation across the predetermined symbol-time and thereby detect the abrupt change in phase, and measure the time of that change relative to the center of the symbol-time (or other predetermined time at which the timestamp point is transmitted). For example (in dash), at 154, the user device can determine a zero-cross time for the phase analysis progressing forward in time and backward in time, and can determine the timestamp point as the midpoint of those two zero-cross times.

In general, the time of the timestamp point is determined by the base station's clock, but the boundaries of the symbol-time are determined by the user device's clock. Therefore, any deviation of the timestamp point, relative to the middle of the symbol-time, indicates a timing disagreement between the base station's clock setting and the user device's clock setting.

At 155, optionally, the user device can compare digitized data points of the timing signal with a uniform sine wave, or with the local oscillator. The time of the timestamp point is indicated where the comparison changes abruptly. This method requires high SNR due to the dependence on individually digitized data points, but can provide precise timing, according to some embodiments.

At 156, optionally, the user device can localize the change in phase by varying the fitting time of a template function, and finding a region of enhanced fitting quality when the template function is positioned at the abrupt phase change.

At 157, optionally, the user device can calculate a "sensitizing" function that emphasizes the shape of the timestamp point, such as a second derivative of the timing signal.

At 158, optionally, the user device can analyze the timing signal in multiple ways such as those listed above, and can then combine the various results in a weighted average or the like, such as weighted according to the estimated uncertainty of each result.

By these or other signal processing and analysis methods, the user device can precisely localize the timestamp point, and then can proceed to synchronize its clock with the base station's clock, according to some embodiments.

Figure 2:
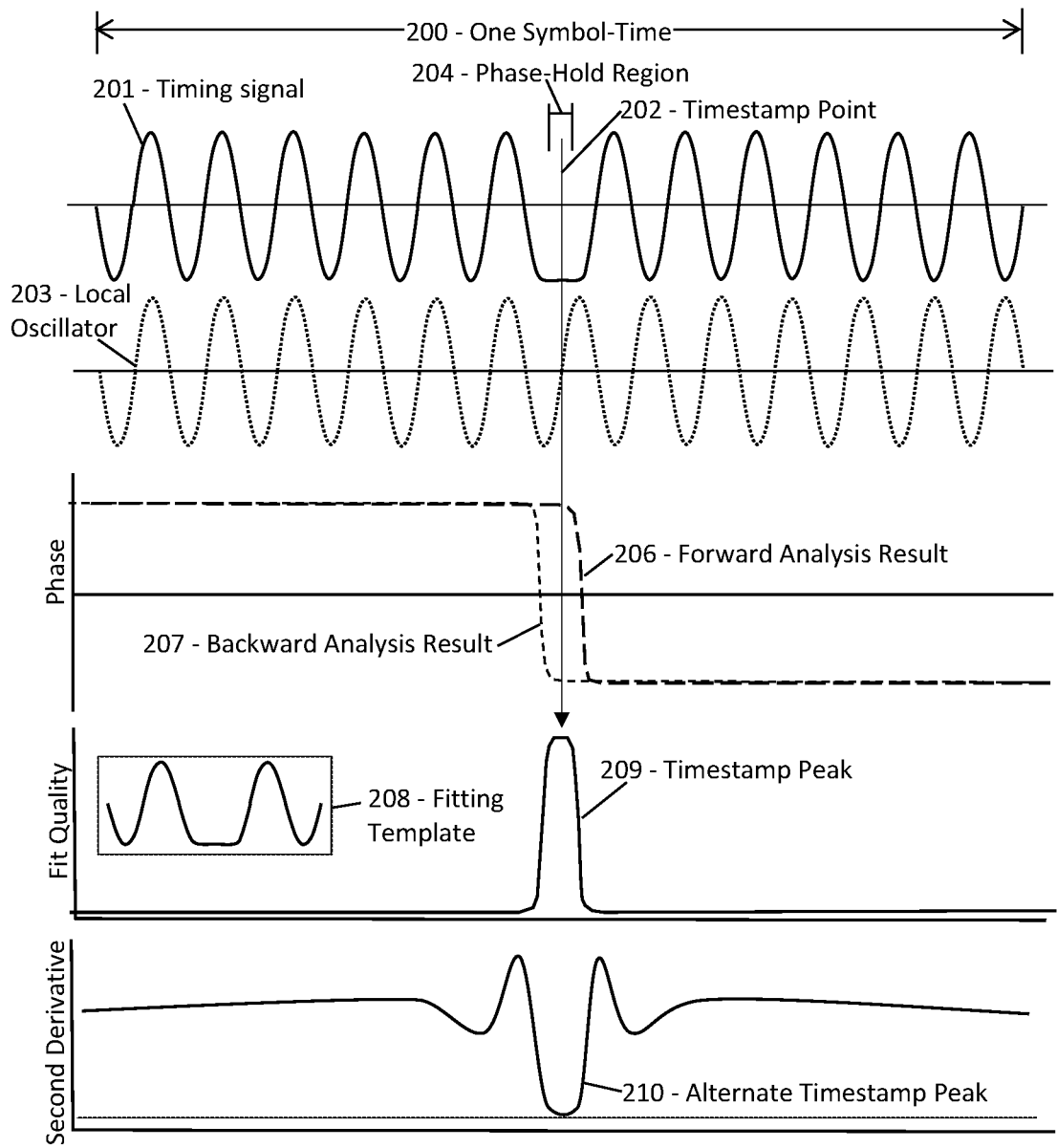
FIG. 2 is a schematic showing an exemplary embodiment of a timing signal containing a short delay, according to some embodiments.

FIG. 2 is a schematic showing an exemplary embodiment of a timing signal containing a short delay, according to some embodiments. As depicted in this non-limiting example, a single symbol-time 200 includes a timing signal 201, which is initially in phase with a local oscillator 203, but then at a timestamp point 202, the waveform holds constant for a "phase-hold" region 204 (one-half wavelength in this example), after which the timing signal resumes oscillating 180 degrees out of phase with the local oscillator 203. A receiver can receive the timing signal 201, determine that it is initially in phase with the local oscillator 203, and then determine that the phase suddenly changes. The resulting phase curves 206, 207 are shown for forward and reverse analysis, with a small displacement due to the time required for the receiver electronics to accumulate enough measurement data to recognize the phase reversal, as mentioned. The timestamp point 202 is then selected or calculated as the time midway between the zero-crossing times of the two phase curves 206, 207.

As an alternative, the receiver can determine the timestamp point 202 using a fitting template 208 configured to match the timing signal 201 in the vicinity of the timestamp point 202. The fit quality is shown including a timestamp peak 209 of high quality fit. The timestamp point 202 is centered in the timestamp peak 209.

As a further alternative, the receiver can measure the second derivative (or other function enhancing the phase change region) based on the digitized timing signal data, and can thereby locate the phase-hold region 204 around the timestamp point 202. In the phase-hold region 204, the timing signal 201 has a nearly zero second derivative, resulting in the timestamp peak (or dip) 210 as shown, in an otherwise uniform sine wave. (The oscillatory behavior of the second derivative is suppressed by analysis, to more clearly accentuate the timestamp point.)

Using any of the above analysis techniques, or other suitable means for determining the timestamp point 202, the phase-hold region 204 may be detected. In addition, in cases where the SNR is low, the phase-hold feature may be easier to detect than the sharp phase reversal of FIG. 1.

Figure 3:
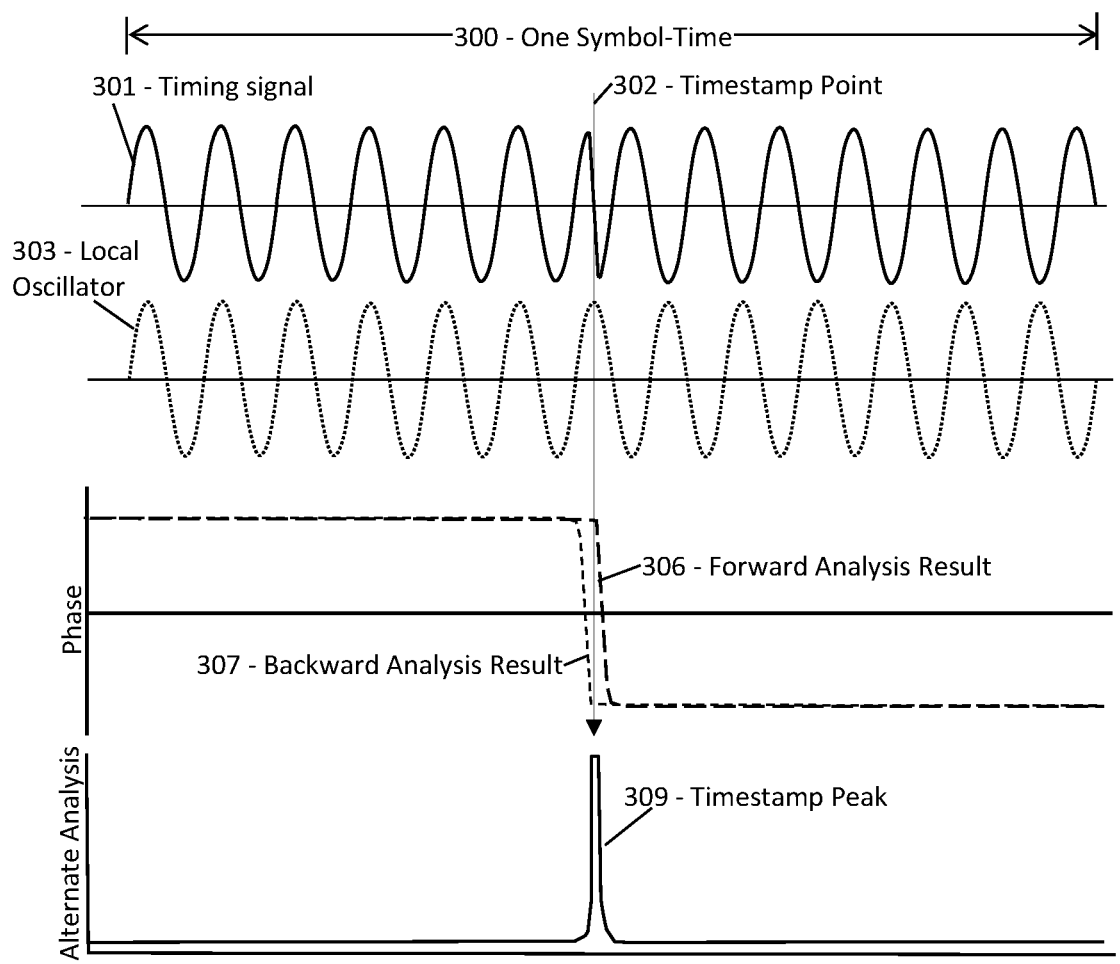
FIG. 3 is a schematic showing an exemplary embodiment of a timing signal containing a sign reversal, according to some embodiments.

FIG. 3 is a schematic showing an exemplary embodiment of a single symbol-time 300 containing a timing signal which includes an amplitude reversal, according to some embodiments. As depicted in this non-limiting example, a timing signal 301 is initially in phase with a local oscillator 303, but then at the timestamp point 302 the timing signal 301 abruptly reverses sign, and then continues oscillating 180 degrees out of phase with the local oscillator 303. The receiver can measure the relative phase between the timing signal 301 and the local oscillator 303 sequentially in the forward and reverse directions, thereby determining the phase curves 306, 307 as shown. The timestamp point 302 is then midway between the two phase curves.

Alternatively, the receiver can perform a sliding template fit as described above, or a second-derivative analysis, or a direct search of the raw digitized data if the signal is strong enough, or other signal processing procedure, and can thereby localize the timestamp peak 309 in a variety of ways as mentioned. Since receivers are generally limited in bandwidth, the actual transition may not be explicitly detected by the digitizer. Indeed, the transmitter may opt to not even transmit that short segment. Nevertheless, the receiver can determine the time of the timestamp point according to the change in phase of the surrounding timing signal.

Figure 4:
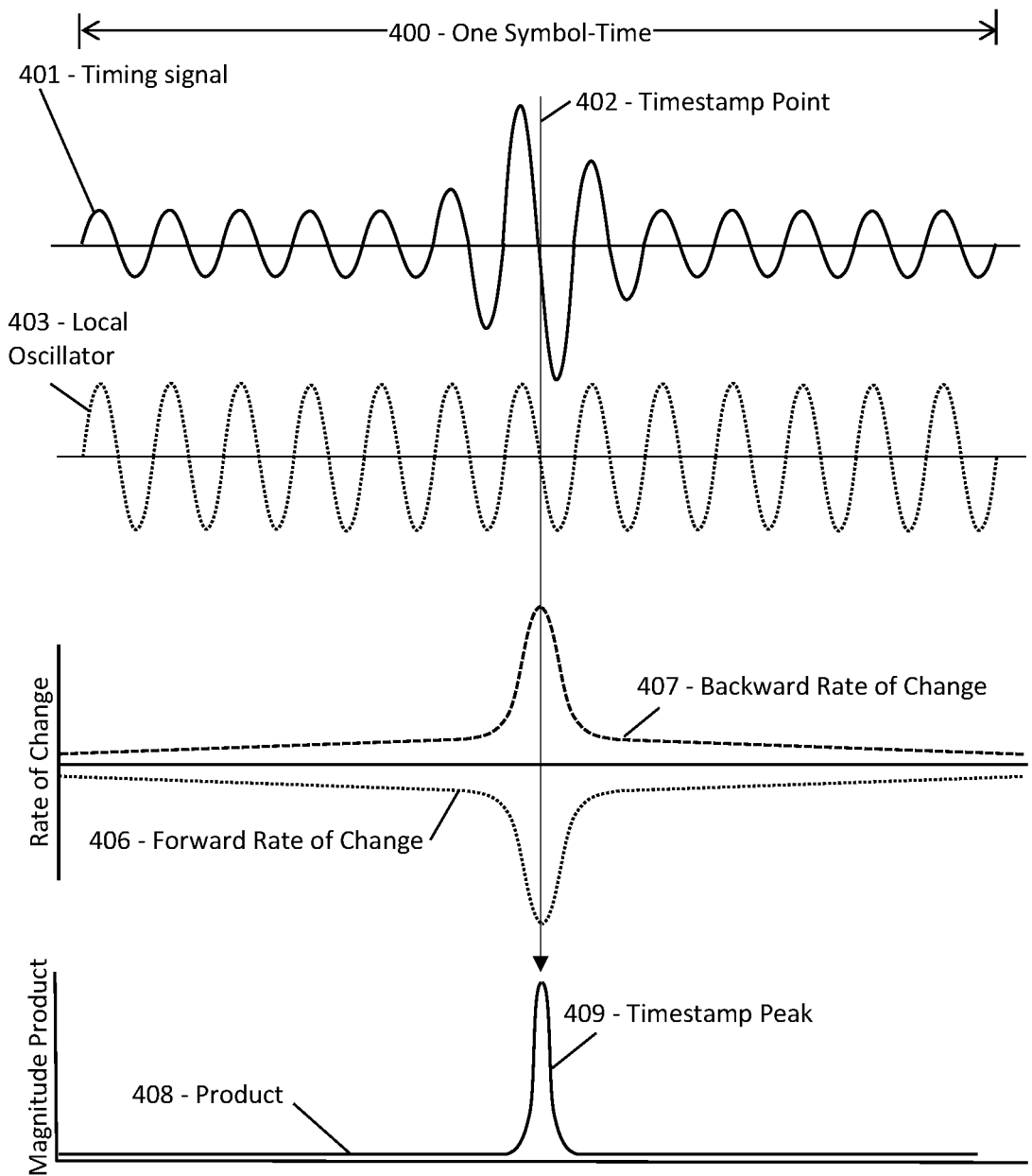
FIG. 4 is a schematic showing an exemplary embodiment of a timing signal containing an amplitude pulse, according to some embodiments.

FIG. 4 is a schematic showing an exemplary embodiment of a timing signal containing an amplitude pulse, according to some embodiments. As depicted in this non-limiting example, a single symbol-time 400 includes a timing signal 401, which is in phase with a local oscillator 403 throughout; hence, this example has no phase reversal. The timing signal 401 initially has a small amplitude as shown, but the amplitude is substantially increased for a short time near a timestamp point 402. The increased amplitude is represented here by a single wavelength of increased amplitude, although in practice the enhanced amplitude region may include multiple wavelengths for easier detection. The increased amplitude region is symmetrically configured around the timestamp point 402. The timing signal 401 then continues oscillating after the timestamp point 401 at the initial amplitude, and still in phase with the local oscillator 403.

A receiver can localize the timestamp point 402 directly by digitizing the timing signal 401 and comparing point-by-point, if the SNR is sufficient and the signal processing bandwidth is sufficient. The receiver can thereby reveal the region around the timestamp point 402 with enhanced amplitude. For example, the receiver can determine which portion of the timing signal 401 exceeds a threshold, and can estimate the time of the timestamp point 402 at the midpoint of that region. Alternatively, the receiver can fit the amplitude distribution to a predetermined shape such as a Gaussian shape centered on the timestamp point 402.

Alternatively, when SNR is limited, the receiver can measure the forward and backward rate of change of the timing signal 401 as shown by the curves 406, 407 (oscillatory behavior suppressed for clarity) and detect the time of enhanced signal or signal variation. The rate of change is largest in magnitude at the timestamp point 402, and is opposite in sign when measured in the forward and reverse directions. The receiver can then localize the timestamp point further by combining the forward and reverse amplitude rate curves 406,407, for example by multiplying them (in magnitude). The multiplication thereby results in a product curve 408 including a timestamp peak 409. The product curve 409 is generally narrower than the original curves 406, 407 if both are centered on the timestamp point 402 (barring nonlinearities which are ignored herein).

Alternatively, the receiver can use other signal processing, such as a fitting template or a zero-cross analysis for example, or other suitable signal processing and analysis, and can thereby localize the increased amplitude zone and determine the timestamp point 402 precisely.

Figure 5A:
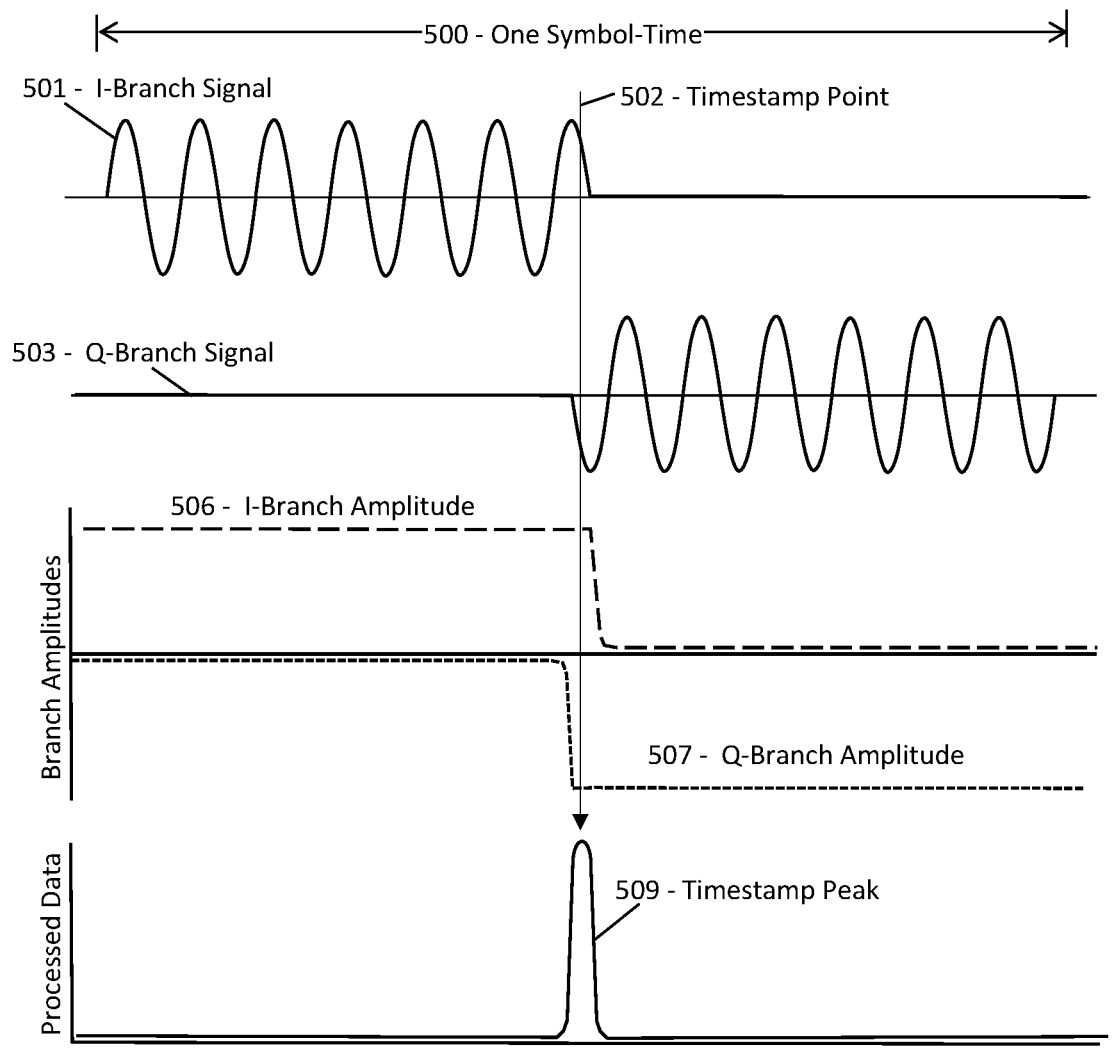
FIG. 5A is a schematic showing an exemplary embodiment of a timing signal containing a branch reversal, according to some embodiments.

FIG. 5A is a schematic showing an exemplary embodiment of a timing signal containing a branch reversal, according to some embodiments. As depicted in this non-limiting example, a transmitter transmits a resource element symbol-time 500 containing two QAM-modulated orthogonal timing signals, which are configured as an I-branch signal 501 and (at 90 degrees phase) an orthogonal Q-branch signal 503. Unlike normal QAM message elements, the I and Q timing signals 501, 503 switch modulation at the middle of the symbol-time 500. Initially, the I-branch signal is transmitted with a particular amplitude (such as the maximum branch amplitude of the modulation scheme) on a particular frequency corresponding to the subcarrier of the message element. Then the I-branch signal abruptly reduces to zero amplitude at a timestamp point 502 and continues at zero amplitude thereafter. The Q-branch signal 503 is initially at zero amplitude, but abruptly changes to a full amplitude signal. The Q-branch signal is then at 270 degree phase relative to the I-branch signal 501 after the timestamp point 502, which is equivalent to a negative amplitude value. A receiver can receive the message element 500, measure the I and Q amplitudes separately versus time, and thereby determine the time of the timestamp point 502. Hence with sufficient SNR and digitization rate, the receiver can discern the timestamp point 502 from the raw digitized data.

Alternatively, the receiver can determine the relative amplitude between the branch signals 501, 503 as shown. Curves 506 and 507 indicate the resulting amplitudes of the I and Q branches versus time. The I-branch amplitude is initially high and drops to zero at the timestamp point 502, or slightly later due to the signal ringdown. The Q branch amplitude is initially zero and abruptly turns on, but with a constant amplitude (negative, in this case) and a different phase (−270 degrees, in this case). The receiver can then precisely locate the timestamp point 502 midway between the I and Q branch transitions.

Alternatively, the receiver can localize the timestamp point 502 by measuring an overlap of the two branch amplitude signals 506, 507. The I and Q branches cannot match at the timestamp point because they have orthogonal phases. In this case, they overlap for ¼ wavelength, centered at the timestamp point 502, as a result of the 270 degree phase difference between the branches. The overlap then determines the timestamp peak 509 as shown. The width of the timestamp peak 509 corresponds to the transition between the I-branch and Q-branch amplitudes. The timestamp point 502 is then centered in the timestamp peak 509. Other equivalent configurations of the I and Q signals are possible and anticipated, with equivalent results.

As a further alternative, the receiver can calculate the rate of change of the I and Q timing signals. This would also generate a timestamp peak 509 similar to that shown, due to a sudden coordinated change in those signals.

In other embodiments, the receiver can perform a sliding fit to a template that includes the expected I and Q branch amplitude shapes, including their relative phase difference, in the vicinity of the timestamp peak 502. In each case, the receiver can determine the timestamp peak 509 and select the peak center as the time of the timestamp point 502.

An advantage of using QAM modulated branches to indicate the timestamp point may be that the stress on the transmitter is minimized, since the transmission power remains nearly constant as the transmitted signal is shifted from one branch to another, which is a phase shift as opposed to an overall amplitude change. Another advantage may be that most modern wireless receivers are already prepared to perform signal processing with QAM.

FIG. 5B is a flowchart showing an exemplary embodiment of a procedure for transmitting and receiving a timestamp signal containing a branch reversal, according to some embodiments. As depicted in this non-limiting example, at 551 a transmitter transmits a timing signal in a timing resource element (which may be surrounded above and below by blank subcarriers to account for the bandwidth spreading). The timing signal is an I branch signal and an orthogonal Q branch signal, with the I branch signal initially having a high amplitude and Q branch signal having zero amplitude, but then at the timestamp point, the timing signal switches to Q with maximum amplitude and I with zero amplitude.

At 552, a receiver receives the timing resource element and extracts from it an I branch signal and an orthogonal Q branch signal as-received. The receiver determines a first time at which the I branch signal switches from a high amplitude to zero, and a second time at which the Q branch signal switches from zero to a high amplitude (in magnitude). The timestamp point is midway between those two times.

At 553, the receiver may determine the timestamp point by finding a brief region where the two non-zero branch regions overlap. The timestamp point is centered in that overlap region.

At 554, the receiver may scan the I and Q signals from the left and right (that is, forward and backward in time), determining when each branch transitions to a different amplitude. The timestamp point is midway between those two values.

At 555, the receiver may calculate a sum-signal phase equal to an arctangent of a ratio of the Q amplitude divided by the I amplitude. The timestamp point is at the time where the sum-signal phase switches from a low value to a high value, or vice-versa.

At 556, the receiver may prepare a fitting template which emulates the two branches, including an I shape and a Q shape, corresponding to the region around the timestamp point. The receiver may calculate a fit quality versus the fitting time at various positions on the timing signal. The timestamp point is then the fitting time at which the template has the best fit.

At 557, the receiver may combine the various results of the above-described analysis methods, in a weighted average for example, with the weighting being inversely related to the estimated uncertainty of each method result.

Figure 6:
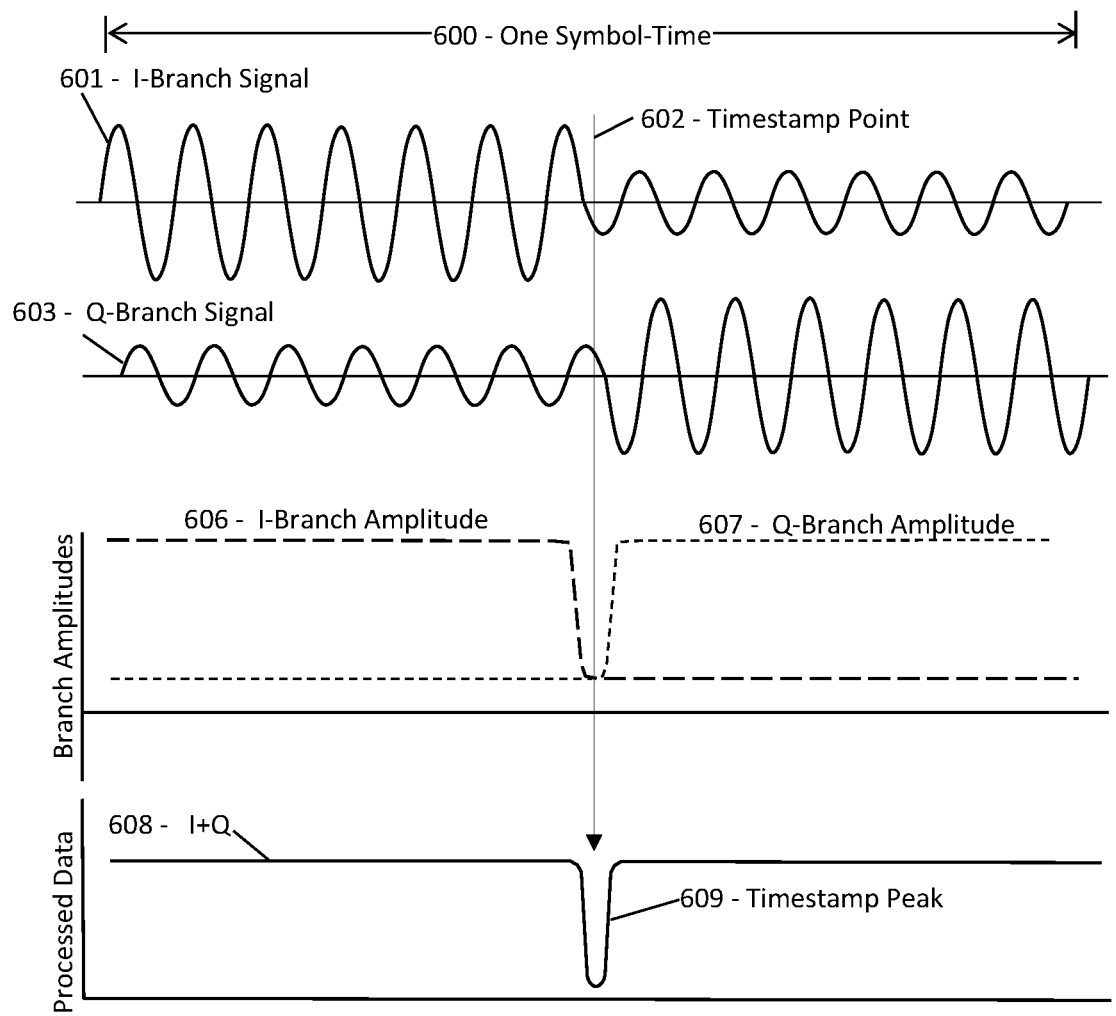
FIG. 6 is a schematic showing an exemplary embodiment of a timing signal containing a branch amplitude change, according to some embodiments.

FIG. 6 is a schematic showing an exemplary embodiment of a timing signal containing a branch amplitude change, according to some embodiments. As depicted in this non-limiting example, a single symbol-time 600 includes two QAM branch signals 601 and 603, modulated as in the previous example except that the minimum amplitude modulation is non-zero in this example. The I and Q amplitudes can be switched between existing states of the QAM scheme at the timestamp point 602, instead of the zero-amplitude states of the previous example, since QAM generally does not include zero-amplitude states. With this change, the receiver can measure the I-branch amplitude and Q-branch amplitude 606, 607 versus time, and can determine a timestamp peak 609 as, in this case, a sum of the I and Q branch amplitudes 608. Due to the relative phases in the case depicted, the timestamp peak 609 may appear as a dip as shown, and the receiver can determine the timestamp point 602 as the center of the timestamp peak or dip.

Alternatively, as discussed in the previous example, the receiver can measure a first time when the I branch changes amplitude and a second time when the Q branch changes amplitude, with the timestamp point midway between. Alternatively, the receiver can calculate a phase difference or a sum-signal phase or an amplitude ratio or other formula that indicates where the branch amplitude change occurs. It is immaterial how the receiver determines the time of the timestamp point, as long as the receiver thereby determines the time of the timestamp point relative to the receiver's resource grid, which is determined by the receiver's clock. The receiver can then calculate a clock time error equal to the difference between the time of the as-transmitted timestamp point (as specified in a schedule, for example) and the time of the as-received timestamp point (determined by the receiver relative to the receiver's clock). The receiver can then correct its clock setting to resolve the disagreement.

Depending on the implementation, a timing advance, such as the one-way propagation time and processing delay of uplink signals, may be included in the clock setting, or it may be applied at transmission time, or at another time, so that the uplink messages will arrive at the base station synchronized with the base station's resource grid.

Figure 7A:
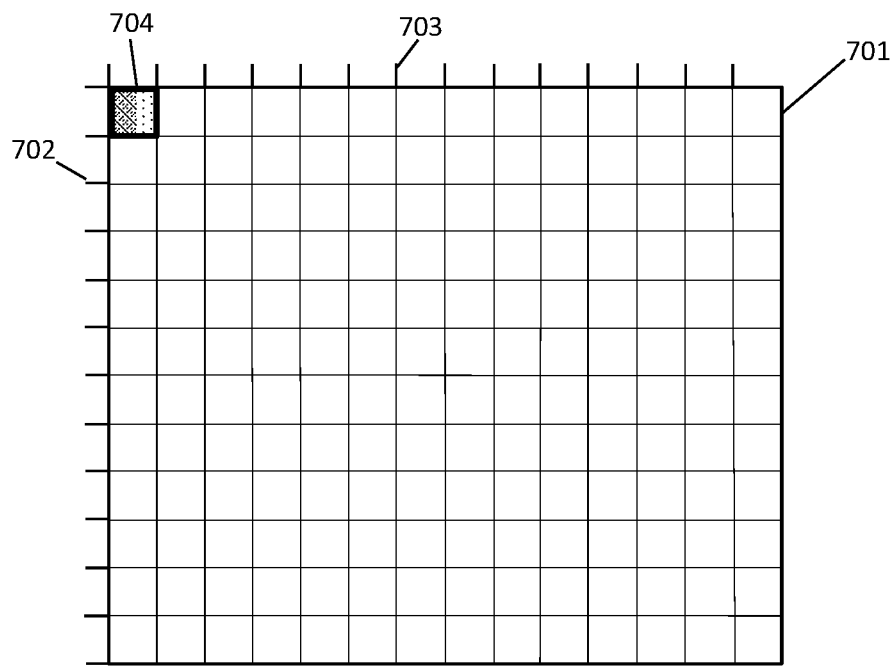
FIG. 7A is a schematic showing an exemplary embodiment of a resource grid containing a timing signal, according to some embodiments.

FIG. 7A is a schematic showing an exemplary embodiment of a resource grid containing a timing signal, according to some embodiments. As depicted in this non-limiting example, a resource grid 701 includes one subframe defined by 14 symbol-times 703 and 12 subcarriers 702. A single resource element includes a timing signal 704 which is indicated by a heavy outline as shown. The timing signal 704 includes a first half of the resource element with a first amplitude or phase (dark stipple), followed by a second half of the resource element with a different amplitude or phase (light stipple). The interface between the two halves is the timestamp point.

The resource element 704 is transmitted by a base station periodically. For example, the timing signal may be transmitted in the first subcarrier of the first symbol time of the first subframe of a 10 millisecond frame, thereby enabling multiple user devices to update their clock times periodically, with very low resource consumption. Users may be informed of the synchronization schedule, including the position and periodicity of the timing signal 704, for example by convention or system information files. There may be no need for messages indicating the transmission and reception times of the timestamp point because the users may already know when the timing signals will occur, according to convention or system information files. The users can therefore adjust their clock times according to the received timestamp point, and can thereby cancel the accumulated clock drift that has accumulated since the last timing signal, and can thereby remain in synchrony with the base station.

Figure 7B:
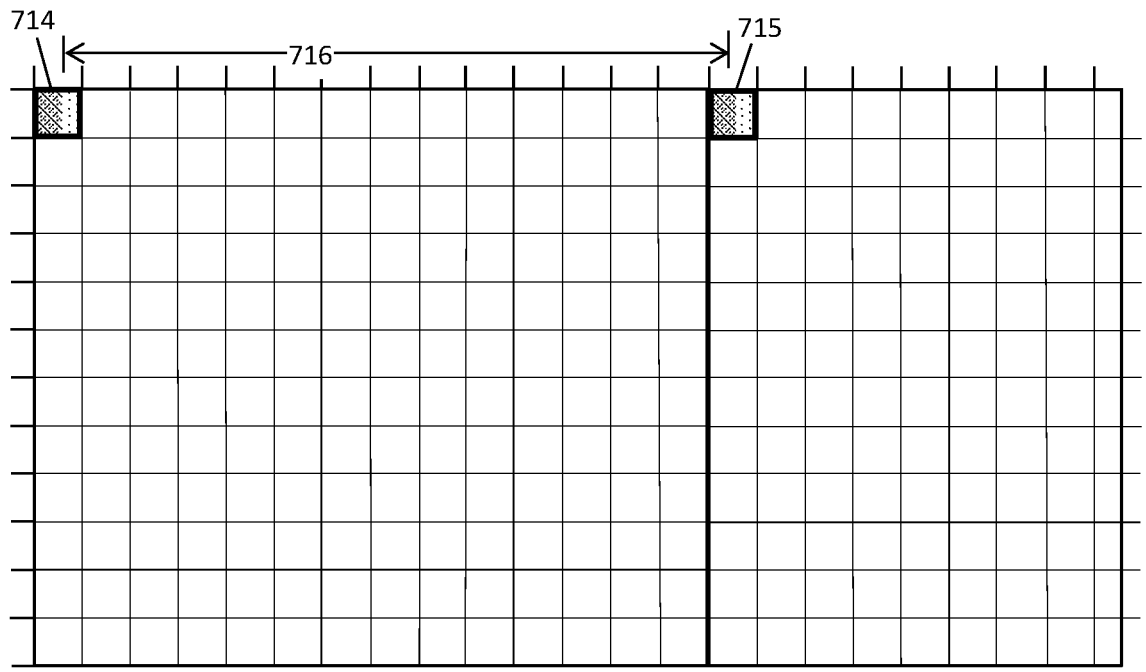
FIG. 7B is a schematic showing an exemplary embodiment of a resource grid containing two timing signals, according to some embodiments.

FIG. 7B is a schematic showing an exemplary embodiment of a resource grid containing two timing signals, according to some embodiments. As depicted in this non-limiting example, a base station can enable a user device to adjust its clock rate by transmitting two downlink timing signals 714, 715 which in this case are in the first symbol-time of two sequential subframes. The user device can adjust its clock time according to the first timing signal 714 as discussed above. The user device can then adjust its clock rate according to the time difference 716 between the two timestamp points 714, 715. In the example, the time difference 716 corresponds to the time duration of a subframe, which is known to the user device by convention or system information files. Alternatively, the time difference 716 may be a periodicity with which the base station transmits the timestamp points. In either case, all of the user devices of a network can adjust their clock time and clock rate to agree with the base station clock, by measuring the interval 716 between the two timing signals 714, 715. No additional messaging or other overhead are required, in this case. Such a lean resource-efficient synchronization protocol may be necessary to keep user devices aligned with the base station in high-frequency networks.

Figure 7C:
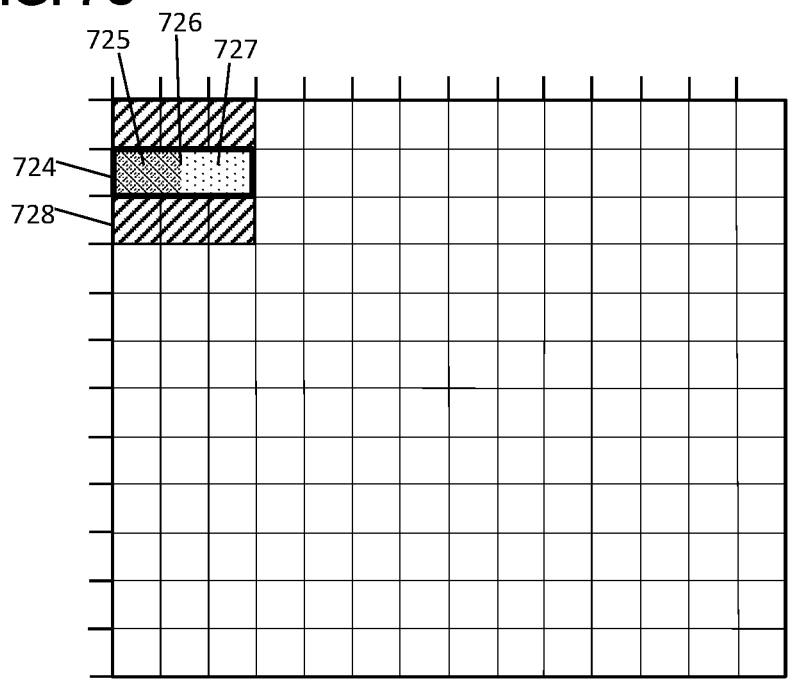
FIG. 7C is a schematic showing an exemplary embodiment of a resource grid containing an elongated timing signal, according to some embodiments.

FIG. 7C is a schematic showing an exemplary embodiment of a resource grid containing an elongated timing signal, according to some embodiments. As depicted in this non-limiting example, a set of three time-spanning resource elements containing a timing signal 724, which includes a timestamp point 726 centered between a first region 725 (dark stipple) containing a first amplitude or phase, and a second region 727 (light stipple) containing a second amplitude or phase. The first amplitude or phase thus occupies the first resource element and half of the second resource element, while the second amplitude or phase occupies the second half of the second resource element and the third resource element. There is no guard space or other interruption of the timing signal in the three resource elements, in this example.

A receiver can receive the three-element timing signal 724, determine the as-received frequency of the timing signal 724, and compare to the expected frequency according to the receiver's clock. The receiver can thereby determine a frequency drift, and can adjust the user device's clock rate to eliminate that drift. In addition, the receiver can set its clock time according to the time of the received timestamp point 726 relative to the receiver's resource grid. The additional duration of the continuous three-element timing signal may enable the receiver to determine both the timestamp point and the frequency, with sufficient precision, in a single instance of the elongated timing signal 724.

The example also shows blank resource elements 728 (diagonal hatch) above and below the timing signal 724. The blank resource elements may avoid crosstalk from adjacent messages, and may also assist the user in processing the timing signal despite sideband generation due to the modulation change at the timestamp point 726.

Figure 7D:
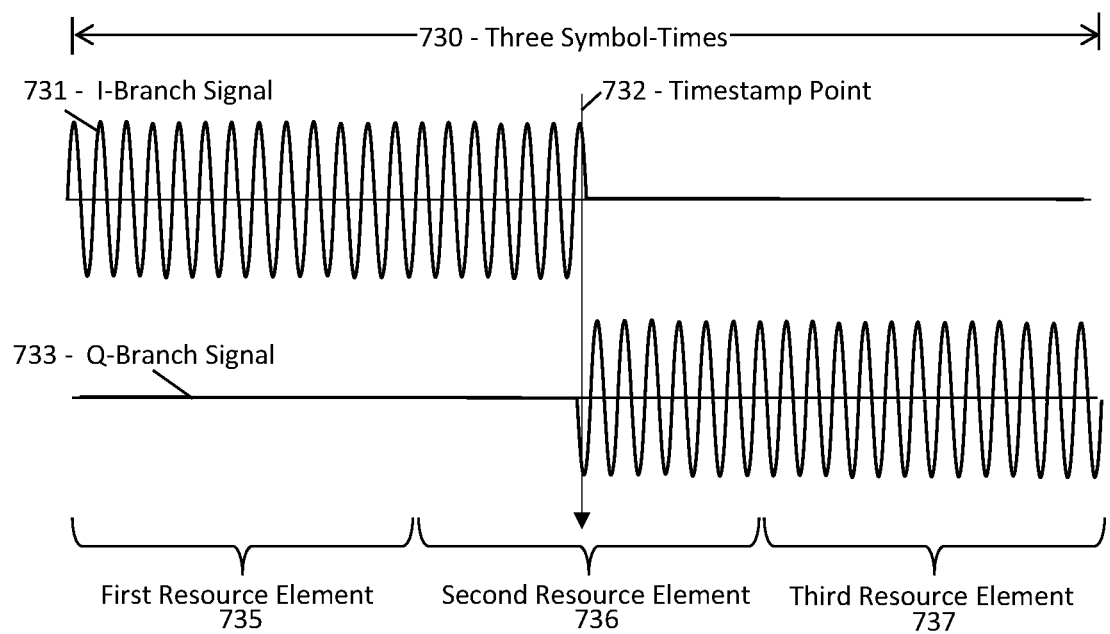
FIG. 7D is a schematic showing an exemplary embodiment of an elongated timing signal with a branch reversal, according to some embodiments.

FIG. 7D is a schematic showing an exemplary embodiment of an elongated timing signal with a branch reversal, according to some embodiments. As depicted in this non-limiting example, a set of three time-spanning resource elements 730 includes a first, second, and third resource element 735, 736, 737. An I-branch signal 731 and an orthogonal Q-branch signal 733 provide a timestamp point 732. As described in the previous examples, the I-branch signal 731 is a continuous sine wave of a particular amplitude spanning the first resource element 735 and half of the second resource element 736, and is zero thereafter. The Q-branch signal 733 is initially zero, but after the timestamp point 732, it becomes a continuous sine wave signal with the particular amplitude, spanning the second half of the second resource element 736 and the third resource element 737.

As mentioned in the previous example, the receiver can detect the I and Q signals, determine the timestamp point 732 when the power switches abruptly between the branches (or alternatively, detect the 90-degree phase change between the branch signals at the timestamp point) and can thereby adjust its clock time to the base station. In addition, the user device can determine the subcarrier frequency according to the elongated 3-element signal and thereby adjust its clock rate.

Due to the many options and variations disclosed herein, and other versions derived therefrom by artisans after reading this disclosure, it would be helpful for a wireless standards committee to establish conventions governing formats and implementation options for providing mid-symbol timestamp points and ultra-lean procedures for precision synchronization, as disclosed. Such beneficial timing and frequency alignment procedures may enable users to communicate in 5G and 6G multi-GHz bands with increased reliability, while avoiding unnecessary signaling and delays.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a user device of a wireless network to synchronize with a base station of the wireless network, the method comprising:
   a) determining, according to a clock of the user device, a resource grid comprising symbol-times in time and subcarriers in frequency, wherein each symbol-time includes a starting time and an ending time, as determined by the clock of the user device;
   b) receiving a timing signal in a predetermined resource element of the resource grid, wherein the timing signal comprises a first signal followed by a second signal, wherein a phase of the first signal differs from a phase of the second signal;
   c) determining a timestamp time corresponding to a boundary between the first and second signals;
   d) determining, according to a difference between the timestamp time and the starting or ending time of the predetermined resource element, a timing offset; and
   e) adjusting the clock of the user device according to the timing offset, to bring the clock of the user device into agreement with a clock of the base station.

2. The method of claim 1, wherein the timing signal is received according to 5G or 6G technology.

3. The method of claim 1, wherein the phase of the second signal equals the phase of the first signal plus 90 degrees.

4. The method of claim 1, wherein the phase of the second signal equals the phase of the first signal plus 180 degrees.

5. The method of claim 1, wherein the boundary between the first and second signals occurs when both the first signal and the second signal pass through zero.

6. The method of claim 1, wherein the boundary between the first and second signals occurs when both the first signal and the second signal are equal to a maximum value.

7. The method of claim 1, wherein the boundary between the first and second signals occurs when the first signal is a maximum positive value and the second signal is a maximum negative value.

* * * * *